United States Patent [19]
Michizoe et al.

[11] 4,001,368
[45] Jan. 4, 1977

[54] METHOD FOR CONTINUOUS EXTRUSION MOLDING OF THERMOSETTING RESINS

[75] Inventors: Yoshio Michizoe, Takatsuki; Masafumi Toyomatsu, Kadoma; Masakatsu Uchida, Nagoya, all of Japan

[73] Assignee: Dai Nippon Toryo Co. Ltd., Osaka, Japan

[22] Filed: Feb. 8, 1974

[21] Appl. No.: 440,810

[52] U.S. Cl. .................. 264/176 R; 264/209; 264/236; 264/349
[51] Int. Cl.² .................................. B28B 3/20
[58] Field of Search ............... 264/176 R, 236, 83, 264/40, 329, 347, 209, 349; 260/862

[56] References Cited
UNITED STATES PATENTS

| | | | |
|---|---|---|---|
| 2,729,618 | 1/1956 | Muller et al. ................ 260/75 |
| 2,857,624 | 10/1958 | Hanzel et al. ................ 264/177 R |
| 2,913,770 | 11/1959 | Beno ................ 264/346 |
| 3,054,142 | 9/1962 | Hinderer et al. ................ 264/174 |
| 3,078,511 | 2/1963 | Sjveet ................ 260/67.6 R |
| 3,139,657 | 7/1964 | Maly ................ 264/83 |
| 3,201,503 | 8/1965 | Benning et al. ................ 264/95 |
| 3,242,244 | 3/1966 | Maly ................ 264/83 |
| 3,358,334 | 12/1967 | Headrs ................ 264/329 |
| 3,461,490 | 8/1969 | Cottingham ................ 425/113 |
| 3,642,964 | 2/1972 | Rausch et al. ................ 264/40 |
| 3,661,877 | 5/1972 | Bluestein et al. ................ 260/88.7 |
| 3,700,624 | 10/1972 | Adachi et al. ................ 260/862 |
| 3,812,225 | 5/1974 | Horoda et al. ................ 264/236 |
| 3,830,772 | 8/1974 | Busch et al. ................ 260/862 |
| 3,835,088 | 9/1974 | Takamiya et al. ................ 260/862 |
| 3,856,885 | 12/1974 | Taraya et al. ................ 260/862 |
| 3,864,069 | 2/1975 | Takiura et al. ................ 264/40 |

FOREIGN PATENTS OR APPLICATIONS 2,162,329  7/1972  Germany ................ 264/176 R

OTHER PUBLICATIONS

"Handbook of Epoxy Resins," Lee & Neville, 88.6–88.7 6–18, McGraw Hill, 1967.

*Primary Examiner*—Jay H. Woo

[57] ABSTRACT

This invention relates to a method for continuous extrusion molding of thermosetting resins which comprises extruding a thermosetting resin so that the resin has at the outlet end of an extruder a flowability corresponding to a needle penetration degree of at least 20 and curing the extruded resin at a temperature of 80° to 250° C under a pressure not higher than 200 kg/cm² for a residence time of 1 second to 5 minutes.

9 Claims, 7 Drawing Figures

METHOD FOR CONTINUOUS EXTRUSION MOLDING OF THERMOSETTING RESINS

BACKGROUND OF THE INVENTION

1. Field of the Invention:

This invention relates to a continuous extrusion molding method for preparing products of various crossectional configurations by extrusion molding of thermosetting resins.

More specifically, the invention relates to a method for continuous molding of thermosetting resins which comprises extruding a thermosetting resin so that the resin has at the outlet end of an extruder a flowability corresponding to a needle penetration degree of at least 20 and immediately curing the extruded resin in a mold at a temperature of 80° to 250° C under a pressure not higher than 200 kg/cm$^2$ for a residence time of 1 second to 5 minutes.

2. Description of the Prior Art:

Extrusion molding of thermoplastic resins such as polystyrene resins, polyethylene resins and vinyl chloride resins has heretofore been conducted broadly in various fields. However, uses of molded articles of thermoplastic resins are severely limited because they are inferior in heat resistance and mechanical strength.

Thermosetting resins have heretofore been used for a molding method for preparing molded articles of a relatively small size, such as compression molding and injection molding methods, or for a molding method of a very low manufacturing efficiency such as a hand lay-up molding method.

A method for extrusion molding of thermosetting resins according to the ram process is known in the art (see U.S. Pat. No. 3,461,490). In this known method, however, it is impossible to mold thermosetting resins by continuous extrusion because the molding operation has to be conducted intermittently. More specifically, when the final stroke of the ram is completed, the extrusion operation is stopped, and after the ram is returned to the start point, the material is supplied and the molding operation is initiated again. Accordingly, since the molding operation is stopped when the ram is returned to the starting point, it is impossible to conduct the molding operation continuously, and since the molding pressure attained when the ram is advancing differs greatly from the pressure imposed when the ram is retreating, both the kind of molded product obtainable and the starting thermosetting resins are severely limited.

There is also known a method comprising plasticizing a thermosetting resin by employing an extruder of the screw type, feeding the plasticized material to a transfer pot, and casting the material into a mold from the transfer pot by means of a compression or injection molding apparatus different from the extruder used for plasticization, to thereby effect the compression or injection molding (see U.S. Pats. No. 3,233,288, No. 3,278,992 and No. 2,746,089). In such known method, however, the extruder is used only for plasticization of a thermosetting resin and attainment of safe feeding of the resin material, and the molding pressure is given by a different apparatus. In other words, in such known method, though the extruder is used for feeding of the resin material, the molding mechanism is substantially the same as that adopted in the conventional compression or injection molding.

In each of these known methods, the molding operation is conducted intermittently, and hence, it is impossible to perform extrusion molding continuously.

As means for overcoming such defects involved in the conventional methods, there has been proposed a method for drawing molding of thermosetting resins. In this method, since the resin material must resist the drawing force, use of a reinforcer such as a glass fiber roving is indispensable, and limitations are imposed on the kind of the resin material, the amount of a filler or other additive, and the like, with the result that application fields of final molded products are naturally limited.

Further, thermosetting resin compositions such as disclosed in, for example, U.S. Pat. No. 3,562,201 have been used for the conventional transfer molding method or extrusion molding method for preparing molding articles of a small size, but it is impossible to perform the extrusion molding continuously with use of such thermosetting resin composition.

As is seen from the foregoing, no method capable of continuously extrusion molding ordinary thermosetting resins has been known in the art.

SUMMARY OF THE INVENTION

This invention relates to a method for continuous extrusion molding of thermosetting resin compositions, which can overcome the foregoing defects and disadvantages involved in the conventional techniques. Objects of this invention are, for example, as follows:

1. To provide a method in which a thermosetting resin composition can be extrusion molded continuously and hence, molded articles can be obtained at a very high manufacturing efficiency.
2. To provide an extrusion molding method to which thermosetting resin compositions of a broad range which have heretofore been used in ordinary compression molding and injection molding methods can be directly applied.
3. To provide a molding method in which the molding operation can be controlled and maintained very easily.

This invention relates to a molding method according to which thermosetting resins of a broad range including those heretofore used for compression molding and injection molding can be extrusion molded continuously. More particularly, the invention relates to a method for continuous extrusion molding of thermosetting resins which comprises extruding a thermosetting resin so that the resin has at the outlet end of an extruder a flowability corresponding to a needle penetration degree of at least 20 and then molding the extruded resin in a mold at a temperature of 80° to 250° C under a pressure not higher than 200 kg/cm$^2$ for a residence time of 1 second to 5 minutes.

Figure 1:
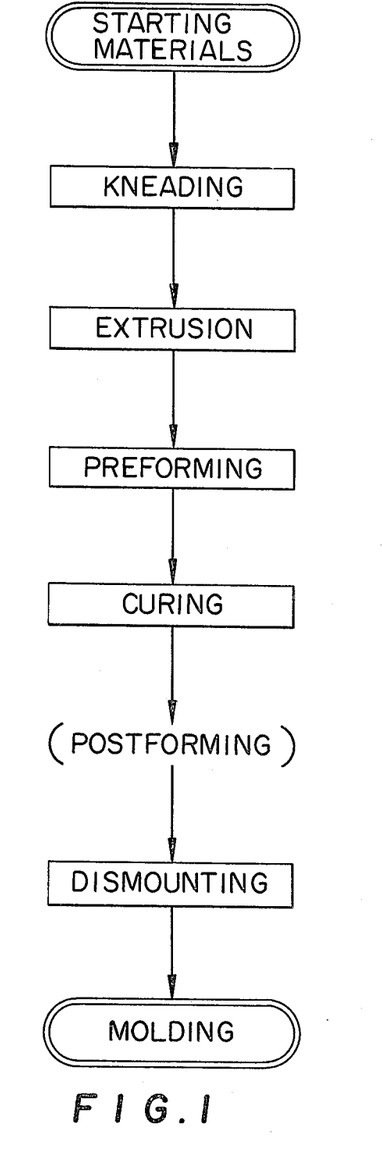
FIG. 1 is a flow sheet, illustrating the continuous extrusion molding method of this invention.

DETAILED DESCRIPTION OF THE INVENTION:

The steps of the method of this invention are as shown in the flow sheet of FIG. 1. The method of this invention will now be illustrated by reference to FIG. 1.

At the kneading step, a starting material comprising a thermosetting resin, a curing agent, a filler and other additives is mixed or melt kneaded to form a homogeneous composition. In order to improve the flow characteristics of the resin at the extrusion molding and the quality of the resulting molded article, it is desirable that this kneading step be performed sufficiently.

In some of thermosetting resins the curing reaction is allowed to advance even at room temperature, and most thermosetting resins are port in thermal stability and the range of processing temperatures is severely limited. Accordingly, the pot life of the resin compound or the temperature adjustment at the kneading step is very important.

The mixing of components of the starting resin composition can be performed by various methods and a suitable method is chosen depending on the kind of the resin component. For instance, all of the components can be mixed at one time or they can be added successively. It is also possible to form in advance the starting material components into some mixtures and finally blend them into one mixture.

The above kneading can be performed by means of a high speed disperser, a kneading roll, a hot roll, a kneader, a compression kneader, a Bunbury mixer, a Henschel mixer, a screw type extruder or the like. It is preferred to choose a suitable kneading means among them depending on the properties of a thermosetting resin to be used.

In case a screw type extruder is used at the kneading step of the method of this invention, it is possible to perform the kneading and extrusion steps successively in a continuous manner. Further, use of a screw type extruder for kneading is advantageous in that since the starting components are kneaded in a closed chamber, splashing or escape of the raw material can be effectively prevented. Of course, it is possible to conduct the kneading and extrusion steps separately, but when the raw material has a short pot life, it is preferable to conduct the kneading and extrusion steps in a continuous manner.

When the kneading abd extrusion steps are conducted separately, the kneaded raw material is withdrawn in a liquid, massive, granular or powdery state or in the form of a ribbon (having, for example, a thickness of 2 to 3 mm) or a rope, and then it is fed to the next extrusion step.

At the extrusion step, the raw material coming from the kneading step under atmospheric or elevated pressure is transported by the rotation of a screw toward the tip end thereof. The rate of the screw rotation to be used at this extrusion step can be freely varied, and it is operated at a suitable rate of rotation. When the extrusion step is performed by using an apparatus in which the molding material is transported along a screw provided in a cylinder, the resin is plasticized by the heating action of the cylinder and the frictional heat of the resin material per se, and is forwarded toward the tip end portion of the extruder.

Then, the resin material is extruded to a preliminary molding mold and a curing mold, where the molding is accomplished. In order to keep the resin material to be fed to the molding step in the uncured or precured (not completely cured) state, it is desirable to provide a heating or cooling zone in the extruder to control the cooling or heating degree and effect the plasticization at a high efficiency.

The material forwarded and compressed by rotation of the screw is pre-molded and is directly extruded into a curing mold by the feed pressure given by rotation of the screw of the extruder. The material extruded in the curing mold is cured while it is transported in the curing mold.

In conducting the curing step, a heating or cooling zone is provided, according to need, in the curing mold for performing the molding while adjusting the temperature. For example, the inlet temperature of the curing mold is maintained at a low level while the outlet temperature is maintained at a high level. It is possible to maintain the entire curing mold at a constant level, or to cool the inlet of the mold. In this invention, it is specified that the molding is performed at a temperature ranging from 80° to 250° C, but this is the range of te average temperature in the mold and cooling of a part of the mold is included in the scope of this invention.

The cured molded article is heated (post-cured) or cooled, if desired, to correct warp or twist, and is cut into a desired size to obtain a final product.

It is not technically very difficult to conduct the above steps separately, but according to the conventional techniques it is impossible to perform these steps continuously in combination under stable conditions.

Figure 2:
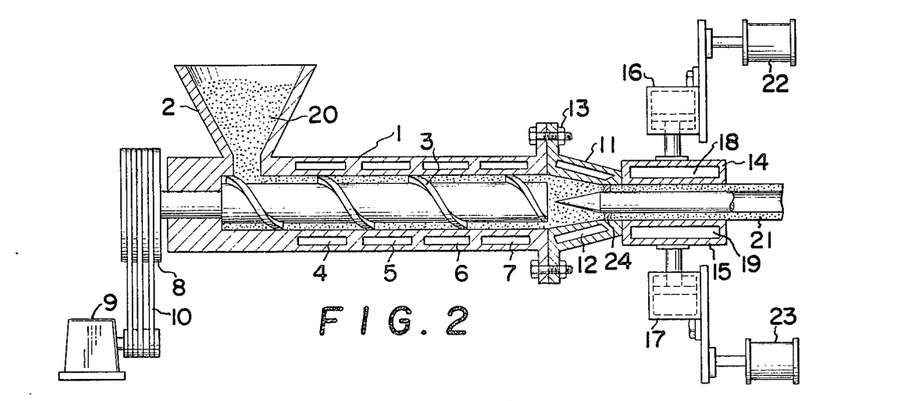
FIG. 2 is a view illustrating the section of an example of the extrusion molding machine to be used for the practice of the method of this invention.

The method of this invention will now be illustrated more detailedly by reference to an embodiment of the continuous extrusion molding machine shown in FIG. 2.

A raw material 20 comprising a thermosetting resin, a filler, a curing agent and other additives is fed to a hopper 2 of an extrusion molder. The raw material is gradually and successively extruded toward the tip end portion (into the right direction in FIG. 2) by rotation of an extrusion screw 3 mounted in a cylinder 1 while it is being kneaded. At this point the raw material is heated by friction among the resin molecules or friction of the resin component with the screw. Therefore, at this stage, a cooling medium is passed through cooling medium passages 4, 5, 6 and 7 to control accelerated elevation of the temperature and advance of the curing reaction. In the cae of some raw materials, these passages can be heated by passing a heating medium through these passages.

The extrudate is then forwarded to a preliminary mold 11 attached to the tip end portion of the extruder by means of a fixing bolt 13, where a desired cross-sectional configuration is given to the extruded resin material. At this stage, the curing reaction is not still caused to occur. At this stage, the resin material temperature is controlled by passing a heating medium through a heating medium passage 12 so that the resin has a viscosity corresponding to a needle penetration degree of at least 20, preferably at least 200 (the degree of needle penetration is determined under a load of 100 g for a loading time of 5 seconds according to the Test for Penetration of Bituminous Materials specified in ASTM D5). If the needle penetration degree is lower than 20, the flow resistance is extremely high in the preliminary mold and hence, the molding material flows backward and the amount of the raw material fed is not in agreement with the amount extruded, with the result that residence of the resin material occurs and the resin is cured by the frictional heat. This is the reason for limiting the needle penetration degree to at least 20 in this invention.

The softened material extruded from the orifice 11 (preliminary mold) is immediately heated by a pair of molds 14 and 15 having heating medium passages 18 and 19, respectively, and simultaneously compressed by cylinders 16 and 17, whereby the resin is completely cured and a product 21 is obtained. If cylinders 22 and 23 are provided as shown in FIG. 2, a series of the operations at this step ca be synchronized with the continuous motion of the extruder. In general, the extrusion operation is performed while the molds 14 and 15 are kept in the fixed state, but under some conditions it is desired that the molds are moved at the same speed as the extrusion speed. For attaining this feature, oil pressure cylinders 16, 17 and 22, 23 are disposed. In such case, cylinders 22 and 23 are used for moving parting molds 14 and 15 forward and backward in the extrusion direction and cylinders 16 and 17 are used for moving reciprocatively the molds in the compression direction. The cylinders 16, 17 and 22, 23 are so disposed that they can be repeatedly operated by means of a suitable control device.

At the curing step, in order to smoothen the surface of the molded article it is necessary that the surface of the resin material be closely contacted with the mold or the resin material be compressed into the mold until the resin is sufficiently cured. More specifically, it is necessary that the curing step be performed at a temperature of 80° to 250° C, under a pressure not higher than 200 kg/cm$^2$ for a residence time of the resin in the mold ranging from 1 second to 5 minutes.

Figures 3, 4:
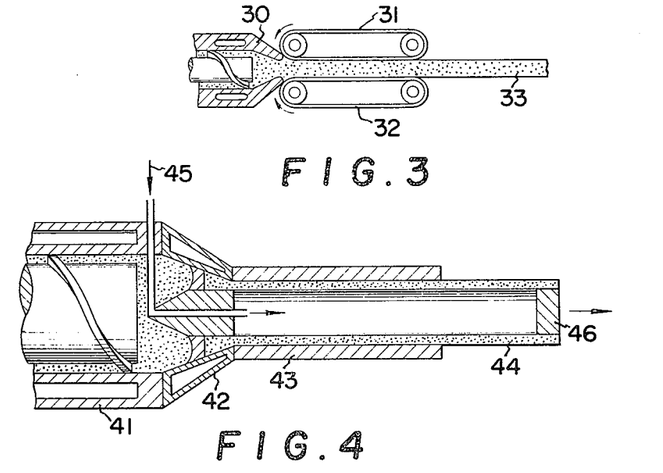
FIGS. 3, 4 and 5 are view showing modifications of the molding machine of FIG. 2 in which the tip end portion is varied.

In addition to the molding apparatus shown in FIG. 2, in order to accomplish the compression and heating continuously, an apparatus such as shown in FIG. 3 can be employed. In the apparatus shown in FIG. 3, the kneaded thermosetting compounds are extruded between a pair of heated belt conveyers 31 and 32 running from the tip end of a cylinder 30 are provided instead. When this apparatus is used, a plate-like article 33 can be prepared continously.

Also an apparatus such as shown in FIG. 4 can be used for practice of the method of this invention, and in this case a hollow molded article can be prepared continuously. A tube-like, softened material preliminarily molded at an orifice 42 of an extruder 41 is grasped by a heated curing mold 43. Then, a stopper 46 is fixed to the terminal end portion of the molded article 44 and compressed air 45 is blown in the hollow portion of the tube-like material to inflate it so that it is closely contacted with the mold surface, whereby a cured product 44 having a desired configuration can be obtained.

Figure 5:
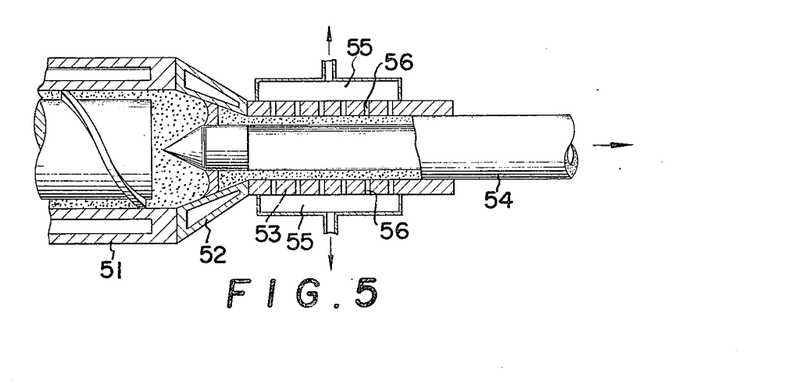

Further, an apparatus such as shown in FIG. 5 can be used. When this apparatus is employed, a raw material preliminarily molded at an orifice 52 of an extruder 51 is passed through a mold 53 provided with a pressure reducing chamber 55 and an air-permeating hole 56, and the material is extruded while it is closely contacted with the mold by pressure reduction, whereby a molded article having a desired configuration can be obtained.

Still in addition, it is possible to obtain a molded article by extruding the resin material into a heated alloy of a low melting point.

In each of the foregoing embodiments, the heating can be accomplished by hot air, far infrared rays, induction heating or the like.

If necessary, the post-curing step is conducted to remove the residual distortion from the molded article or to attain complete curing in the molded resin.

It is important that withdrawal of the molded article be performed so that no unbalance is brought about between the withdrawal speed and the extrusion speed. If such unbalance is brought about, the residual distortion in the product becomes great. In view of the foregoing it is preferable that the withdrawal tension be not higher than 5 kg/cm$^2$ of the sectional area of the molded article.

In the continuous extrusion molding method of this invention both the flow characteristics and curing characteristics of the molding material are very important factors. Accordingly, the physical and chemical properties of thermosetting resins to be used in this invention will now be described.

Figure 6:
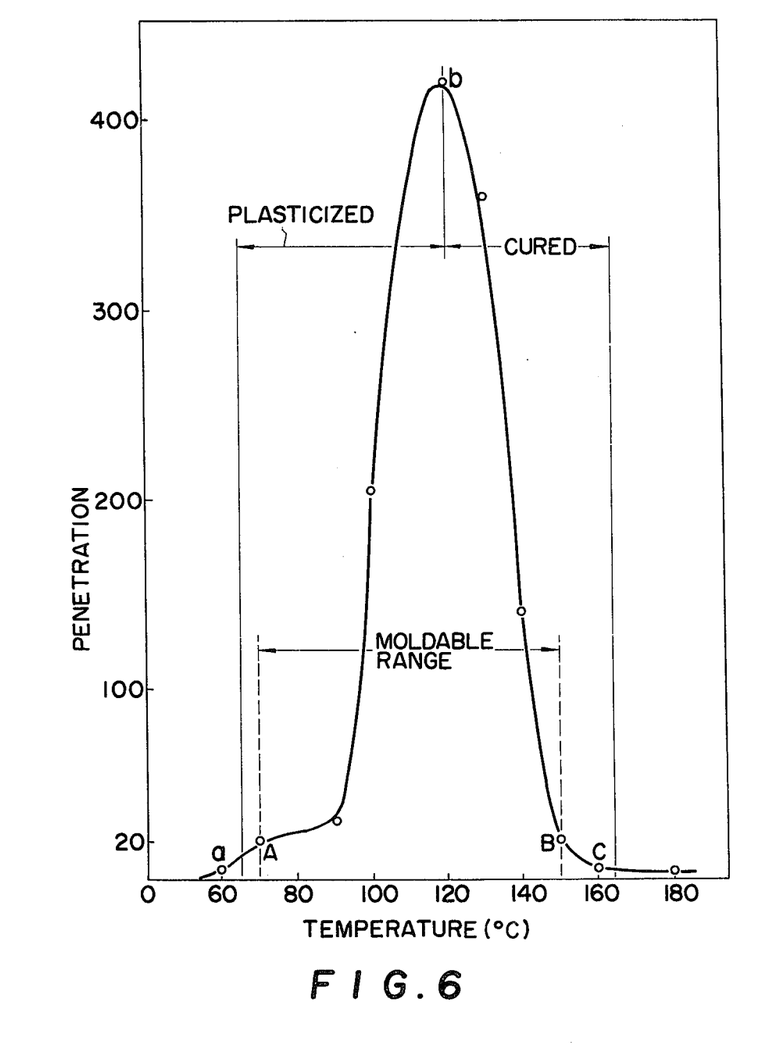
FIG. 6 is a curve showing the flow characteristics of a thermosetting phenol resin, namely the relation between the needle penetration degree and the temperature.
Figure 7:
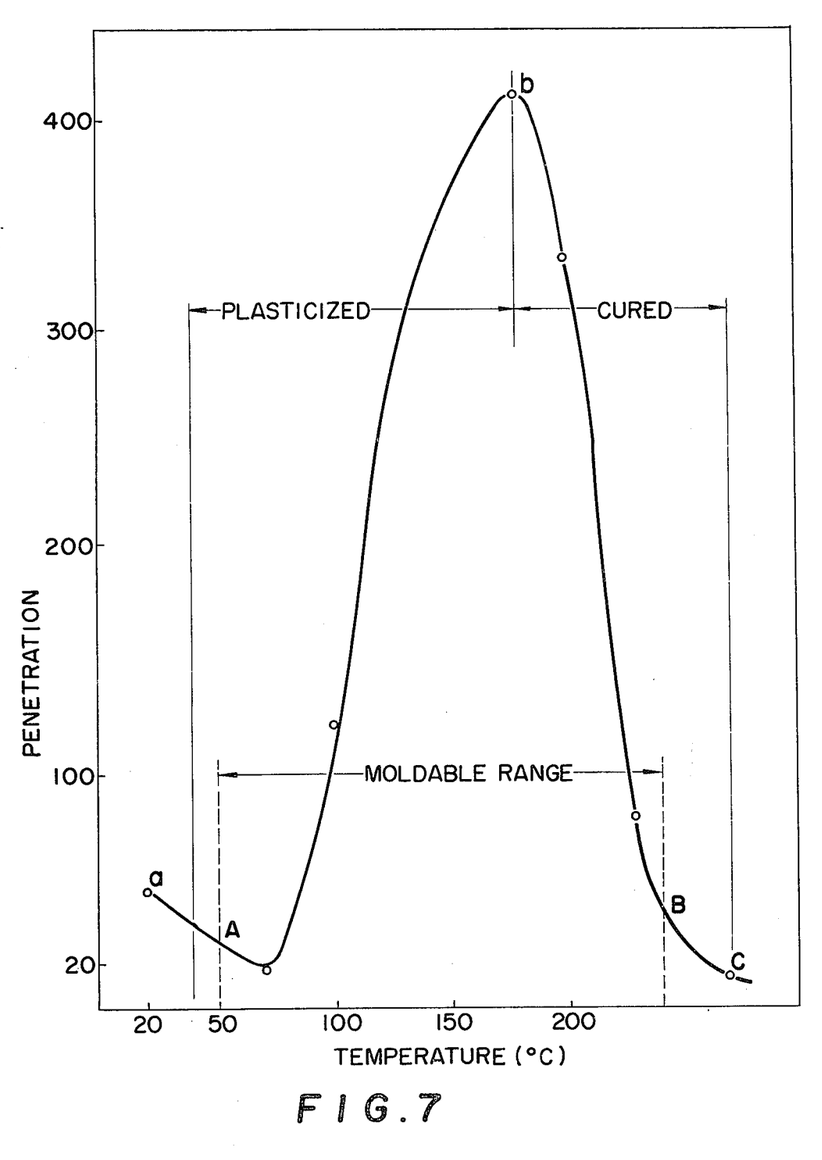
FIG. 7 is a curve showing the flow characteristics of a thermosetting unsaturated polyester resin compound, namely the relation between the needle penetration degree and the temperature.

In general, thermosetting resins have flow characteristics such as shown in FIGS. 6 and 7. More specifically, when a thermosetting resin is heated, from the vicinity of the point $a$ the resin is plasticized and its needle penetration degree is abruptly increased. However, if the temperature is further elevated and reaches the vicinity of the point $b$, the needle penetration degree is lowered because of the curing reaction, and at the final stage the resin is completely cured and it exhibits no flowability even under application of a pressure (point C).

In this invention, the raw material having a needle penetration degree of at least 20 (within a range of from point A to point B in the drawing) is extruded from an extrusion orifice and fed to a curing mold.

Accordingly, in this invention it is necessary to impart optimum flow characteristics to the resin material by adjusting the heating temperatures of the extruder and orifice within such a range as will not cause the curing reaction. Further, the flow characteristics of the resin material, i.e., the degree of needle penetration, can be controlled appropriately by adjusting the mixing ratio among components of the molding material, for example, a mixing ratio between the thermosetting resin and filler.

The curing characteristics of a thermosetting resin are varied depending on the kinds of catalyst, curing agent and curing promotor, the mixing ratios of these agents, the heating temperature of the mold or the like, the residence time, and other factors.

Flow characteristics of an ordinary phenol resin are as shown in FIG. 6, and FIG. 7 is a diagram showing the flow characteristics of an unsaturated polyester compound illustrated in Example 3 given hereinafter.

The above-mentioned method of this invention has the following characteristic features.

1. Although the molding process is performed intermittently in the conventional batchwise method, in the method of this invention a series of steps starting from feeding of a raw material and ending in withdrawal of a molded product can be performed in a continous manner and hence, high manufacturing efficiency can be attained.

2. Since the material is treated in a closed chamber, the operation control and maintenance can be accomplished very easily.

3. A variety of molded articles differing in the crosssectional configuration can be optionally prepared merely by changing the curing mold.

4. Since extrusion is performed continuously according to the screw process, variation in the molding pressure is very small, and hence, it is possible to obtain uniform products.

The following articles can be obtaind by extrusion molding a thermosetting resin continuously according to the method of this invention:
1. Products have a curved surface.
2. Pipes and tubes.
3. Extrusion-coated molded articles.
4. Molded articles having a complicated cross-sectional configuration.
5. Hollow molded articles.

By the term "thermosetting resin" used herein are meant resins that can be cured either at room temperature or under heating to give cross-linked products having a three-dimensional structure. For example, there can be mentioned unsaturated polyester resins, phenol resins, epoxy resins, urethane resins, melamine resins, urea resins, xylene resins, aniline resins, allyl resins, silicone resins and the like. They may be liquid, solid, powdery or granular, or they may have a gel-like or fibrous form. These resins can be used singly, or mixtures of two or more of them can also be used. In case two or more thermosetting resins are used in combination, it is necessary not to choose a combination of resins among which there is no compatibility or in which the curing reaction is extraordinarily accelerated or retarded by mixing. In view of the compatibility with a filler and heat resistance, use of an unsaturated polyester resin is especially preferred.

By the term "unsaturated polyester resin" used herein are meant condensation products between an unsaturated polybasic acid or its mixture with a saturated polybasic acid and a polyhydric alcohol. These condensation products modified with an epoxy or amino compounds are also included in the unsaturated polyester resin. In general, they are used in a form of the mixture with a compolymerizable unsaturated monomer.

As the unsaturated polybasic acid there can be mentioned, for example, maleic acid, maleic anhydride, fumaric acid, citraconic acid, itaconic acid and the like. As the saturated polybasic acid there can be exemplified phthalic acid, phthalic anhydride, isophthalic acid, terephthalic acid, tetrachlorophthalic anhydride, hexachloroendomethylene tetrahydrophthalic acid tetrabromophthalic anhydride, endomethylene-tetrahydrophthalic anhydride, tetrahydrophthalic anhydride, hexahydrophthalic anhydride, succinic acid, adipic acid, azelaic acid, sebacic acid, an anthracene-maleic anhydride adduct, a rosinmaleic anhydride adduct, trimellitic anhydride, pyromellitic anhydride, methylnadic acid and the like.

As the polyhydric alcohol to be reacted with the above unsaturated polybasic component, there can be mentioned, for example, ethylene glycol, diethylene glycol, triethylene glycol, polyethylene glycol, propylene glycol, dipropylene glycol, polypropylene glycol, 1,4-butanediol, 1,3-butanediol, 2,3-butanediol, 1,5-pentanediol, 1,6-hexanediol, neopentyl glycol, 2,2,4-trimethyl-1,3-pentanediol, hydrogenated bis-phenol A, 2,2'-bis(4-hydroxyphenylene)propane, an adduct or reaction product between an alkylene oxide and 2,2'-bis(4-hydroxyphenylene)propane, pentaerythritol, glycerin, trimethylene glycol, 2-ethyl-1,3-hexanediol, phenyl glycidyl ether, allyl glycidyl ether, hexanetriol, sorbitol and the like.

The copolymerizable unsaturated monomer to be used in combination with the above unsaturated polyester resin is selected from vinyl, vinylidene, allyl and other compounds having at least one α,β-ethylenic double bond in the molecule. Examples of such unsaturated monomers include styrene, vinyltoluene, chlorostyrene, α-methylstyrene, tert-butylstyrene, divinylbenzene, alkyl esters of methacrylic acid such as methyl methacrylate, alkyl esters of acrylic acid such as ethyl acrylate, vinyl acetate, acrylamide, methacrylamide maleimide, diallyl phthalate, diallyl isophthalate, allyl acrylate, allyl methacrylate, diallyl maleate, diallyl itaconate, diallyl sebacate, diallyl adipate, diallyl glycolate and triallyl phosphate.

Compounds represented by the following general formula can also be used as the copolymerizable unsaturated monomer:

wherein A is a residue of a compound having at least two hydroxyl groups at the molecule ends or a compound having at least one ester or ether linkage in the molecule and at least two terminal hydroxyl groups; X stands for hydrogen, halogen or an alkyl group such as methyl and ethyl; and $n$ and $m$ are integers of 1 to 3.

There may be exemplified ethyleneglycol dimethacrylate, propyleneglycol dimethacrylate, 1,3-butanediol dimethacrylate, 1,4-butanediol methacrylate, 2,3-butanediol dimethacrylate, 2-ethyl-1,3-hexanediol dimethacrylate, 1,5-pentanediol dimethacrylate, 1,6-hexanediol dimethacrylate, neopentylglycol dimethacrylate, glycerin trimethacrylate, dimethacryl (bis-diethyleneglycol) phthalate, dimethacryl (bis-diethyleneglycol) maleate, tetramethacryl (bis-diethyleneglycol) phthalate, triethyleneglycol dimethacrylate, tetramethyleneglycol dimethacrylate, polyethyleneglycol dimethacrylate and trimethylolpropane trimethacrylate.

These compounds have a boiling point higher than that of styrene and can be handled with ease. Further, even when they are added in very small amounts, the cross-linking density can be elevated and the heat distortion temperature can be heightened in the resulting cured molded article.

As the copolymerizable unsaturated monomer, there can also be employed dialkyl esters of maleic acid, fumaric acid and itaconic acid, such as dimethyl maleate, diethyl maleate, dibutyl maleate, dioctyl maleate, diethyl fumarate, diethyl itaconate and the like.

These copolymerizable unsaturated monomers can be used singly or in the form of mixtures of two or more of them.

In view of the water resistance and mechanical properties of the resulting molded article, it is preferable that the above-mentioned unsaturated polyester resin to be used in this invention have an acid value not exceeding 60, especially not exceeding 30, and a number average molecular weight of at least 200, especially at least 1000. It is also preferable that the mixing weight ratio of unsaturated polyester resin/copolymerizable unsaturated monomer be within a range of from 80/20 to 30/70, especially from 70/30 to 40/60.

In order to lessen the shrinkage of the unsaturated polyester resin at the curing step and improve the extrusion moldability of the resin and the surface smoothness and appearance of the resulting molded article, it is preferable that a thermoplastic resin of a high molecular weight be added in the state dissolved in the above-mentioned copolymerizable unsaturated monomer. As such thermoplastic resin there can be mentioned, for example, copolymers of lower alkyl esters of acrylic or methacrylic acid, copolymers of methyl methacrylate with, for example, acrylamide, methacrylamide, acrylonitrile, styrene or the like, styrene-acrylonitrile copolymers, vinyl chloridevinyl acetate copolymers, saturated polyester resins, polyvinyl acetate resins, polyamide resins, cellulose acetate butyrate resins, and the like. It is desirable that these thermoplastic resins have an average molecular weight of at least 10,000, especially of 25,000 to 500,000.

The thermoplastic resin is added in an amount of 1 to 20% by weight, preferably 5 to 15% by weight, based on the sum of the unsaturated polyester resin and copolymerizable unsaturated monomer. In order to attain the low skrinkage and high heat resistance, when such thermoplastic resin is employed, it is desirable that the unsaturated polyester resin to be used comprise the unsaturated polybasic acid component in an amount of at least 50 mole %, especially of at least 75 mole %, based on the total acid components.

A polymerization initiator is incorporated as a curing agent in an amount of 0.2 to 3% by weight based on the mixture of the above unsaturated polyester resin and copolymerizable unsaturated monomer.

Organic peroxides of the high temperature decomposition type in which the decomposition temperature necessary for obtaining a half-value period of 1 minute is higher than 150° C are preferably used as the polymerization initiator in this invention. As such initiator, there may be exemplified methyl ethyl ketone (said decomposition temperature (abbreviated to "d.t." hereinbelow) being 171° C), cyclohexanone peroxide (d.t. = 174° C), tert-butyl hydroperoxide (d.t. = 179° C), p- (or m-)methane hydroperoxide (d.t. = 216° C), cumene hydroperoxide (d.t. = 255° C), 2,5-di-methylhexane-2,5-dihydroperoxide (d.t. = 257° C), tert-butyl perbenzoate (d.t. = 170° C), tert-butyl peracetate (d.t. = 160° C), di-tert-butyl peroxide (d.t. = 186° C), dicumyl peroxide (d.t. = 171° C), 2,5-dimethyl-2,5-di(tert-butylperoxy) hexane (d.t. = 179° C), 2,5-dimethylhexane-2,5-di(hydroperoxide) (d.t. = 275° C), diisopropyl benzene hydroperoxide (d.t. = 205° C), di-tert-butyl perphthalate (d.t. = 159° ), etc. These polymerization initiators may be used singly or in the form of admixtures of two or more of them.

It is possible to employ a combination of an organic peroxide of the high decomposition temperature type such as mentioned above with a polymerization initiator of the low temperature decomposition type in which said decomposition temperature is not higher than 150° C. As such initiator of the low temperature decomposition type, there may be exemplified benzoyl peroxide (d.t. = 130° C), p-chlorobenzoyl peroxide (d.t. = 137° C), 2,4-dichlorobenzoyl peroxide (d.t. = 121° C), propionyl peroxide (d.t. = 118° C), lauroyl peroxide (d.t. = 114° C), acetyl peroxide (d.t. = 123° C), tert-butylperoxy isobutyrate (d.t. = 133° C), succinic acid peroxide (d.t. = 131° C), di-isopropylperoxy dicarbonate (d.t. = 88° C), $\alpha,\alpha'$-azobisisobutyronitrile (d.t. = 106° C), etc. It is preferred that such polymerization initiator of the low temperature decomposition type is used in an amount of up to 20% by weight based on the total amount of polymerization initiators used.

It is also possible to add a curing promotor such as Co, Mn and Fe salts of organic acids, dimethylaniline, diethylaniline and the like.

It is especially preferable that the unsaturated polyester resin to be used in this invention have a high hot strength or its molded article have a Rockwell hardness of at least 100 (R scale) at room temperature.

As the thermosetting phenol resins to be used in this invention, there can be mentioned so-called resol type resins obtained by reacting phenol, cresol, xylenol or the like with an excess of formaldehyde, p-formaldehyde, acetaldehyde or the like, and novolak type resins obtained by reacting an aldehyde such as mentioned above with an excess of a phenol such as mentioned above. The former resins are cured by heating or by addition of an acid at room temperature, and the latter resins are cured by adding p-formaldehyde, hexamethylene tetramine or the like and a divalent metal oxide as a promotor and heating the mixture.

It is possible to use a butadiene-styrene copolymer, a butadiene-acrylonitrile copolymer or a similar synthetic rubber as a modifier for the above-mentioned phenol resin.

The thermosetting epoxy resin to be used in this invention is a macromolecular compound which comes finally to have a three-dimensional structure as a result of the reaction between an organic compound having at least two epoxide groups in the molecule and a curing agent. As such thermosetting epoxy resin there can be mentioned, for example, glycidyl ether type eopxy resins such as bisphenol A type epoxy resins, resorcin type epoxy resins, bisphenol F type epoxy resins, tetrahydroxyphenyl ethane type epoxy resins, novolak type epoxy resins and polyglycol type epoxy resins; glycidyl ester type epoxy resins; methyl-substituted epoxy resins; alicyclic epoxy resins; polyolefin type epoxy resins; glycidylamine type epoxy resins; halogenated epoxy resins; and epoxidized soybean oil and the like. These epoxy resins can be used singly or in the form of mixtures of two or more of them.

As the curing agent for such epoxy resin, there can be mentioned, for example, polyamines such as aliphatic polyamines, aromatic polyamines and alicyclic polyamines; tertiary amines; $BF_3$ complex compounds; imidazoles, imidazolines; organic acid anhydrides such as phthalic anhydride, maleic anhydride and trimellitic anhydride; and other curing agents such as dicyandiamide, diacid hydrazide, amine adducts of epoxy resins, amine adducts of ethylene oxide or propylene oxide, and morpholine. Still in addition, urea-formaldehyde resins, melamine-formaldehyde resins, phenol-formaldehyde resins, aniline-formaldehyde resins, polyhydric phenols and polyvalent isocyanates can be suitably used as the curing agent for the epoxy resin. It is also possible to employ the epoxy resin in the state admixed with a reactive diluent such as octylene oxide, styrene oxide, butyl glycidyl ether, cyclohexene vinyl monoxide, acryl glycidyl ether and the like.

The polyurethane resin to be used in this invention is a macromolecular compound that can be obtained by reacting a polyisocyanate compound having at least 2 isocyanate groups in the molecule and a compound having at least two active hydrogen atoms in the molecule.

As the polyisocyanate compound, there can be mentioned, for example, ethylene diisocyanate, hexamethylene diisocyanate, decamethylene diisocyanate, phenylene diisocyanate, tolylene diisocyanate, naphthylene diisocyanate, 4,4'-methylene-bis(phenylisocyanate), 4,4'-ethylene-bis(phenylisocyanate), 3,3° -diisocyanate-1,4-dimethylbenzene, 1-methyl-2,4-diisocyanate-cyclohexanone, 3,3'-diisocyanate-diethylbenzene, 3,3'-diisocyanate-dimethyltoluene, 3,3'-diisocyanate-dimethylxylene, 3,3'-diisocyanate-diethylxylene, 4,4'-methylene-bis (cyclohexyl-isocyanate), 4,4'-ethylene-bis(cyclohexyl-isocyanate), isophoronediamine diisocyanate, lysine isocyanate and triphenylmethane isocyanate. It is possible to employ a mixture of an excess of such polyisocyanate with a low-molecular-weight polyol as a component causing an addition reaction and chain extension, such as ethylene glycol, propylene glycol, 1,3-butylene glycol, neopentyl glycol, 2,2,4-trimethyl-1,3-pentanediol, hexamethylene glycol, cyclohexane dimethanol, trimethylol propane, hexanetriol, glycerin, sorbitol, sucrose and pentaerythritol. It is also possible to employ these polyisocyanate compounds in such state that their isocyanate groups are temporarily masked with a blocking agent of the phenol, lactam, active methylene, alcohol, mercaptan, acid amide, imide, amine, imidazole, urea, carbamate, imine, oxime or sulfite type.

As the active hydrogen-containing compound, there are employed polyhydroxy compounds, polycarboxylic compounds and polyhydroxycarboxylic compounds. Typical instances of the active hydrogen-containing compound include polyester polyols having a molecular weight of 200 to 5000, polyether polyols having a molecular weight of 2000 to 6000, castor oil derivatives, tall oil derivatives, and polybutadienes having hydroxyl groups at both the terminal ends of the molecule.

In the case of the polyurethane resin, a foamed article can be easily obtained by reacting the above-mentioned polyol and polyisocyanate with water or a blowing agent.

The melamine resin to be used in this invention is a synthetic resin composed mainly of a resinous substance formed by addition condensation reaction between melamine and an aldehyde such as formaldehyde.

The urea resin to be used in this invention is a polymer obtained by condensation reaction between urea and formaldehyde.

The allyl resin to be used in this invention is a diallyl ester formed by condensation reaction between a polybasic acid and allyl alcohol, or a prepolymer thereof. An organic peroxide is incorporated in such allyl resin to cause the curing reaction.

According to need, a thermosetting resin such as mentioned above can be incorporated with a filler such as magnesium carbonate, silica, clay, talc and asbestos, a mold release agent such as stearic acid and aluminum stearate, a thickener such as finely divided silica and bentonite, a dispersing agent such as an anionic, cationic or non-ionic surfactant, a lubricant such as paraffin wax, chlorinated paraffin, and fluorocarbon, a blowing agent of the nitroso, sulfohydrazide, azo or inorganic type, a blowing assistant of the urea, organic acid or metal salt type, a flame retardant such as tricresyl phosphate, triphenyl phosphate and antimony oxide, fibers such as glass fibers, steel fibers, organic fibers and carbon fibers, a colorant such as a dye and a pigment, a curing promotor, a polymerization inhibitor, an antioxidant, an antistatic agent, a stabilizer, and the like.

When a powder of a thermoplastic resin is added to the thermosetting resin to be used in this invention, the flow characteristics and moldability of the resin are improved, with the result that the appearance, toughness, impact resistance and other properties are improved in the resulting molded article. Powders having a particle size not exceeding 100 $\mu$, preferably not exceeding 20 $\mu$, which are composed of such thermoplastic resins as polyethylene, polypropylene, polybutene, polyvinyl chloride, polyvinyl formal, polyvinyl butyral, polyvinylidene chloride, polymethacrylate, polyamide, polycarbonate, polyvinyl fluoride, polyvinylidene fluoride, acetyl cellulose and the like can be used as the powdery thermoplastic resin.

It is preferable that such powdery thermoplastic resin be incorporated in an amount of 1 to 50% by weight based on the total resin components. In the case of polyvinyl chloride, when the amount of the powder is increased, reduction of the mechanical strength is very low, and therefore, it is possible to incorporate the powder in an amount of up to 70% by weight based on the total resin components.

Especially when a powder of polyethylene or polyvinyl chloride is incorporated in an unsaturated polyester resin, the shrinkage is extremely reduced at the curing step and the finished appearance of the molded article can be highly improved.

This invention will now be illustrated in more detail by reference to the following Examples, in which "parts" and "%" are on the weight basis unless otherwise indicated.

EXAMPLE 1

An unsaturated polyester resin solution A (phthalic anhydride/maleic anhydride/propylene glycol mole ratio = 1/1/2.2; acid value = 21; number average molecular weight = 1950; styrene content = 40%) was incorporated with 2% of a benzoyl peroxide paste (BPO/di-octyl phthalate mixing ratio = 1/1 ), and the paste was uniformly dissolved in the polyester resin solution.

Separately, 64 parts of calcium carbonate powder was mixed with 1 part of zinc stearate, and they were blended sufficiently by means of a ribbon blender to obtain a homogeneous dispersion.

The unsaturated polyester resin solution was fed continuously and uniformly to an extruder at a rate of 24 kg/hr by a metering pump and the calcium carbonate powder was fed continuously and uniformly to the extruder at the rate of 78 kg/hr by a metering feeder. Simultaneously, a glass fiber roving (R 2220 MD 495D manufactured by Asahi Fiber) cut into a length of 6 mm by a roving cutter was continuously and uniformly fed to the extruder at a rate of 24 kg/hr. In the extruder, the unsaturated polyester resin solution, calcium carbonate powder and glass fiber roving were kneaded. Extrusion molding was conducted by attaching to the outlet of the extruder such a preliminary mold as would give a hollow cylindrical extrudate having an outer diameter of 60 mm and a thickness of 3 mm. Since the temperature of the interior portion of a cylinder of the extruder was increased by the frictional heat, water cooling was effected so that the cylinder temperature was maintained at a level not exceeding 40° C. When the temperature of the resin passing through the mold was 40° C, the amount of the extrudate was 60 kg per hour and extrusion was difficult. Therefore, the mold was heated, and when the resin temperature was 50° C, the amount of the extrudate was increased to 102 kg per hour. When the mold die was further heated to 100° C, the resin temperature was 56° C and the amount of the extrudate was about 120 kg per hour. Thus, the amount of the extrudate was in agreement with the amount of the raw material, and extrusion could be conducted continuously with ease and very stably. At this time, the needle penetration degree of the extruded resin was 250.

The preliminary mold was heated to control the temperature of the resin passing through the mold to 60° ± 1° C and a curing mold having a length of 1 m was attached to the tip end portion of the preliminary mold. Thus, the curing molding was performed to obtain a pipe-like cured product having a smooth surface. The temperature of the curing mold was maintained at 140° C, and the molding pressure had about 10 kg/cm². Physical properties of the thus obtained molded article are shown in Table 1.

Table 1

| | |
|---|---|
| specific gravity | 1.95 |
| Barcol hardness | 60 |
| Impact resistance (falling ball test using impact core of 500 g) | passed the test of 50 cm falling height |
| Heat distortion temperature | higher than 200° C |

EXAMPLE 2

An unsaturated polyester resin solution B isophthalic acid/maleic anhydride/propylene glycol/neopentyl glycol mole ratio = 1/1.1/1.1; acid value = 18, number average molecular weight = 2200; styrene content = 30%) was incorporated with 2% of a benzoyl peroxide paste (BPO/DOP = 1/1) and the paste was dissolved in the unsaturated polyester resin. This unsaturated polyester resin solution was extruded together with clay, asbestos powder, glass fiber roving cut into 6 mm and stearic acid by feeding them continuously into the same extruder as used in Example 1 so that the extrudate had a composition of 30 parts of the unsaturated polyester resin solution, 50 parts of the clay, 5 parts of the asbestos powder, 15 parts of the glass fiber roving and 1 part of stearic acid. At this time, the temperature of the interior of the cylinder of the extruder was maintained at a level not exceeding 50° C and the temperature of the resin compound passing through an extrusion orifice attached to the extruder was controlled to 70° ± 1° C by heating the extrusion orifice. The needle penetration degree of the extrudate was 320. The extrusion orifice used had an inner diameter of 300 mm and a height of 4 mm. The resin composition extruded from the orifice in the softened state was immediately passed through a steel conveyer maintained at 150° C and having a distance of 3 mm between the upper and lower portions, for a residence time of 2 minutes to obtain a plate having a thickness of 3 mm, physical properties of which are shown in Table 2.

Table 2

| | |
|---|---|
| Specific gravity | 1.8 |
| Barcol hardness | 57 |
| Tensile strength | 4.0 kg/mm² |
| Flexural strength | 9.1 kg/mm² |
| Flexural elasticity | 1080 kg/mm² |
| Impact resistance (falling ball test using impact core of 500 g) | passed the test of 50 cm falling height |
| Heat distortion temperature | higher than 200° C |
| Water absorption | 0.2 % |

EXAMPLE 3

25 parts of the unsaturated polyester resin solution, B, in which 2% of a lauroyl peroxide paste (LOP/DOP = 1/1) had been dissolved in advance, 14 parts of a powdery polyvinyl chloride resin, 55 parts of barium sulfate, 1 part of a liquid composite stabilizer (Zn-Cd-Ba liquid organic complex), 5 parts of asbestos powder and 1 part of stearic acid were roughly kneaded by a kneader and fed to an extruder to perform kneading. The extrusion molding was conducted with use of the same die and curing mold as employed in Example 1. Cooling was conducted so that the interior of the cylinder was maintained below 50° C and the resin temperature at the die outlet was controlled to 60 ± 1° C by heating the die. Continuous and uniform extrusion was possible. At this time the viscosity of the resin corresponded to a needle penetration degree of 280.

The temperature of the curing mold was maintained at 150° C and the molding pressure was about 15 kg/cm². The moldng was accomplished for a residence time of 1 minute and a continuous pipe-like molded article was obtained. When water heated at 100° C was passed through the so obtained pipe, such defects as distortion or leakage were not observed.

EXAMPLE 4

Extrusion molding was conducted with use of the same extruder, die and curing mold as employed in Example 1. The unsaturated polyester resin solution B, in which 2% of a lauroyl peroxide paste (LPO/DOP = 1/1) had been uniformly dissolved, a powdery polyvinyl chloride resin, calcium carbonate, stearic acid and organic synthetic fibers (having a length of 10 mm) were fed continuously to the extruder so that the resin compound had a composition of 25 parts of the unsaturated polyester resin solution, 5 parts of the powdery polyvinyl chloride resin, 65 parts of calcium carbonate, 1 part of stearic acid and 5 parts of the organic synthetic fibers. Molding conditions adopted for continuous operation of the extrusion molding machine are shown in Table 3.

The resulting pipe-like molded article was excellent in the surface finish and had excellent physical properties similar to those of the product obtained in Example 1.

Table 3

| | |
|---|---|
| Inlet temperature of cylinder of extruder | 40° C |
| Outlet temperature of cylinder of extruder | 60° C |
| Outlet temperature of die | 68° C |
| Temperature of curing mold | 130° C |
| Molding pressure in curing mold | 15 kg/cm² |
| Residence time in curing mold | 1 minute |

EXAMPLE 5

Raw material components were continuously metered and fed to an extruder so that a resin compound had a composition of 50 parts of an unsaturated polyester solution C (maleic anhydride/propylene glycol mole ratio =1/1.2; acid value = 25; number average molecular weight = 1700; styrene content = 35%), in which 2% of a benzoyl peroxide paste (BPO/DOP mixing ratio = 1/1) had been uniformly dissolved, 40 parts of fine hollow glass balloons (glass microballons manufactured and sold under the tradename of "Sirasu" by Shirasu Kabushiki Kaisha), 10 parts of chopped glass fiber strands (cut into 12 mm; MB 49 A manufactured by Asahi Fiber) and 1 part of zinc stearate. With use of the same die and curing conveyer as used in Example 2, the resin compound was continuously molded into a continuous plate of a thickness of 3 mm having a smooth surface. The resulting plate was light (specific gravity of 0.4), and was excellent in mechanical properties, heat resistance, heat-insulating property and mechanical processability.

Molding conditions adopted are shown in Table 4.

Table 4

| | |
|---|---|
| Inlet temperature of cylinder of extruder | 40° C |
| Outlet temperature of cylinder of extruder | 62° C |
| Outlet temperature of die | 80° C |
| Temperature of curing conveyor | 150° C |
| Molding pressure in curing conveyor | 5 kg/cm² |
| Residence in time in curing conveyor | 1 minute and 30 seconds |

EXAMPLE 6

A composition comprising 100 parts of a novolak-type phenol resin, 107 parts of wood powder, 12 parts of clay, 13 parts of hexamethylene tetramine, 2.3 parts of magnesium oxide, 2.3 parts of zinc stearate and 4.6 parts of Anilin Black was fed to an extruder and cured by passing it through a mold having an inner diameter of 10 mm to obtain a rod of a diameter of about 10 mm. The resulting molded article was free of warp or twist and was excellent in the mechanical strength. Molding conditions adopted are shown in Table 5.

Table 5

| | |
|---|---|
| Inlet temperature of cylinder of extruder | 40° C |
| Outlet temperature of cylinder of extruder | 92° C |
| Temperature of preliminary mold | 120° C |
| Needle penetration degree of extrudate | 370° C |
| Temperature of curing mold | 170 |
| Molding pressure in curing mold | about 50 kg/cm² |
| Residence time in curing mold | 2 minutes |

EXAMPLE 7

A composition comprising 100 parts of Epicote No. 1004 (epoxy resin manufactured by Shell Chemical Co.) (having a molecular weight of about 1400), 4 parts of 2- methylimidazole, 0.5 part of a flow control agent of the acrylic acid ester type, 30 parts of silica and 5 parts of titanium oxide was heat-molten at 90° C and kneaded, and extrusion molding was carried out by employing an orifice mold attached to the outlet of an extruder so that a pipelike molded article having an outer diameter of 60 mm and a thickness of 3 mm was obtained. The resulting pipe-like molded article had excellent chemical resistance. Molding conditions adopted are shown in Table 6.

Table 6

| | |
|---|---|
| Resin temperature at outlet of extruder | 105° C |
| Needle penetration degree of resin at outlet of extruder | 285 |
| Temperature of curing mold | 250° C |
| Molding pressure in curing mold | about 10 kg/cm² |
| Residence time in curing mold | 25 seconds |

EXAMPLE 8

A composition comprising 110 parts of polyethylene polyphenyl isocyanate (having a viscosity of 350 cps as measured at 25° C, an average molecular weight of 380 and an isocyanate content of 29%), 82 parts of polyether polyol of the propylene oxide-methylglycol type (having an average molecular weight of 3000 and the hydroxyl number of 440), 1 part of a silicon type surfactant, 38 parts of trichloromonofluoromethane (blowing agent), 40 parts of glass fibers (chopped strands having a length of 6 mm) and 2 parts of triethanol amine was mixed in an extruder by cooling the composition at 15° C and extrusion molding was carried out by employing a curing mold attached to the outlet of the extruder so that a pipe-like molded article having an outer diameter of 60 mm and a thickness of 3 mm was obtained. As a result, a molded article composed of a rigid foam was obtained. Molding conditions adopted are shown in Table 7.

Table 7

| | |
|---|---|
| Resin temperature at outlet of extruder | 18° C |
| Needle penetration degree of resin at outlet of extruder | above 450 |
| Inlet temperature of curing mold | 20° C |
| Outlet temperature of curing mold | 120° C |
| Molding pressure in curing mold | about 5 kg/cm² |
| Residence time in curing mold | 2 minutes |

What we claim is:
1. A method for continuous molding of a thermosetting resinous composition to form a cured product, said method comprising the steps of:
  1. extruding a thermosetting resinous composition comprising by weight
      a. 100 parts of a mixture of an uncured unsaturated polyester resin and a copolymerizable unsaturated monomer in the weight ratio of 80/20 to 30/70, respectively,
      b. 1–70 parts of thermoplastic vinyl chloride resin powder,
      c. 0.2 – 3 parts of a polymerization initiator and
      d. a non-reactive filler in a screw-type extruder in which the cylinder temperature is maintained at a at a level not exceeding 92° C. so that the composition has at the outlet end of the extruder a flowability corresponding to a needle penetration degree of at least 20 under a load of 100g for a loading time of 5 seconds according to ASTM D5 and the composition is not cured in the extruder,
  2. passing the extrudate from step (1) through a preliminary molding passage maintained at a temperature of not more than 120° C, said pas- sage having a cross-sectional area decreasing progessively towards the outlet end of said passage;
3. passing the product emerging from said preliminary molding passage through an open-ended die passage maintained at a temperature of 80° to 250° C., under a pressure not higher than 200 kg/cm² for a residence time of 1 second to 5 minutes and
4. withdrawing the cured molded product.

2. The method of claim 1 wherein the penetration degree is at least 200.

3. The method of claim 2 wherein the cured molded product is withdrawn at a tension not higher than 5 kg/cm² of the sectional area of the molded article.

4. The method of claim 3 wherein the uncured, unsaturated polyester resin has an acid value not exceeding 60 and a number average molecular weight of at least 200.

5. The method of claim 4 wherein the uncured, unsaturated polyester resin has an acid value not exceeding 30 and a number average molecular weight of at least 1000.

6. The method of claim 5 wherein said filler is present in the amount of 80–260% by weight of the polyester resin.

7. The method of claim 1 wherein said polymerization initiator is an organic peroxide.

8. The method of claim 7 wherein said peroxide has a decomposition temperature necessary for obtaining a half-value period of 1 minute of higher than 150° C.

9. The method of claim 6 wherein said polymerization initiator is an organic peroxide having a decomposition temperature necessary for obtaining a half-value period of 1 minute of higher than 150° C.

* * * * *